April 29, 1941.  H. A. FELDBUSH ET AL  2,239,886
POWER PLANT REFRIGERATING SYSTEM
Filed April 6, 1939  3 Sheets-Sheet 1
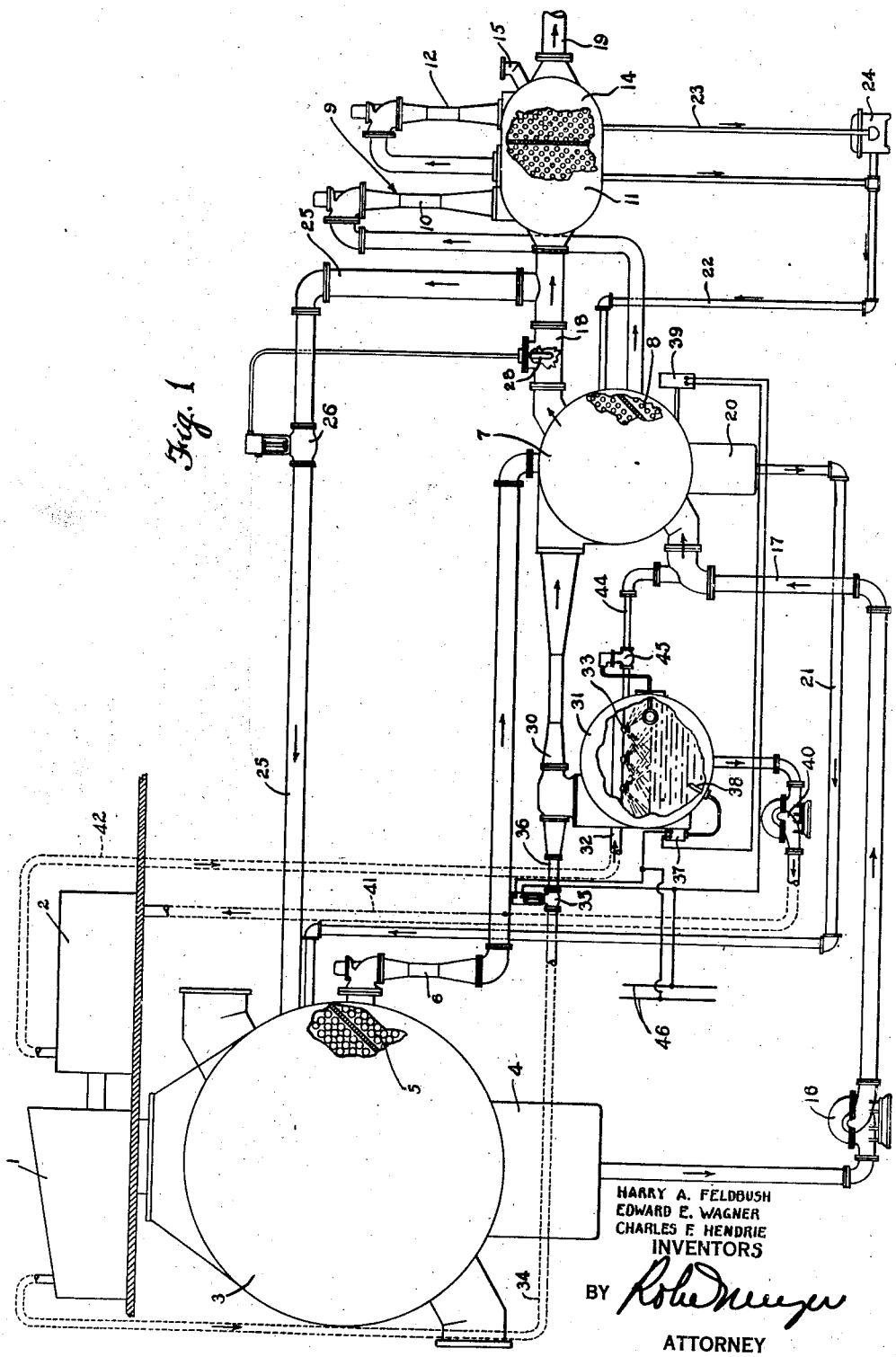
HARRY A. FELDBUSH
EDWARD E. WAGNER
CHARLES F. HENDRIE
INVENTORS
BY Robt Meyer
ATTORNEY

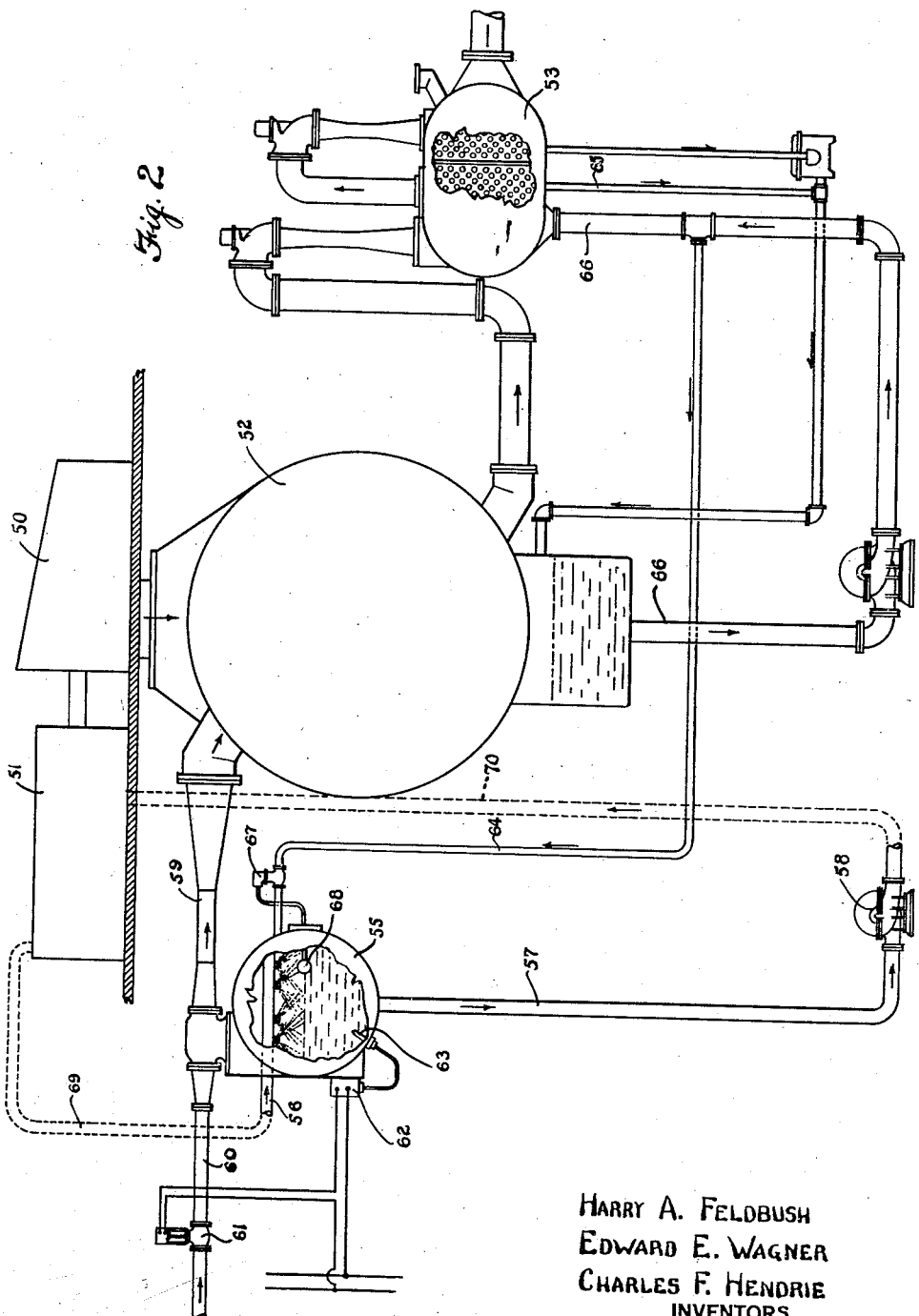

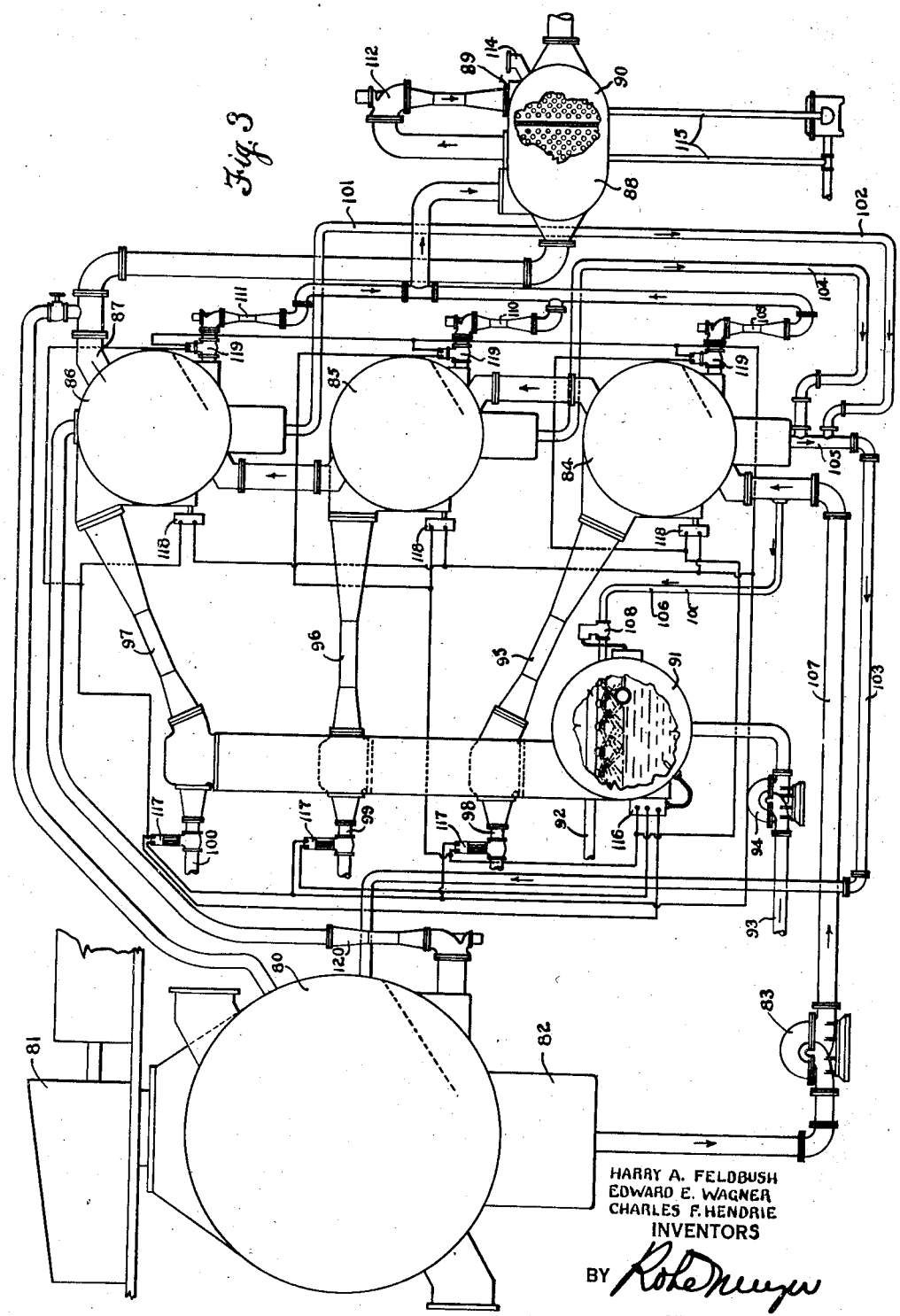

Patented Apr. 29, 1941

2,239,886

UNITED STATES PATENT OFFICE 2,239,886

POWER PLANT REFRIGERATING SYSTEM

Harry A. Feldbush, Short Hills, and Edward E. Wagner and Charles F. Hendrie, Newark, N. J., assignors to Worthington Pump and Machinery Corporation, Harrison, N. J., a corporation of Delaware Application April 6, 1939, Serial No. 266,304

15 Claims. (Cl. 62—2)

This invention relates to power plants, and more particularly to an economical and practical method and apparatus for providing cool or cold water or other refrigerant for various purposes, such as cooling the electric generator, etc., by utilizing steam available in the system of the plant for cooling the water and utilizing the steam condensing system of the plant for in turn condensing the steam employed for cooling the refrigerant in such manner that no heat is lost by the refrigerating operation.

An object of the present invention is to provide a practical and economical system for providing refrigerated water or a refrigerating medium in steam power plants without loss of additional heat and to add to the condensate or boiler feed water heat to the amount of refrigeration obtained, i. e., add to the boiler feed water the heat which is extracted from the refrigerated water or refrigerating medium.

With these and other objects in view, as may appear from the accompanying specification, the invention consists of various features of construction and combination of parts, which will be first described in connection with the accompanying drawings, showing a power plant of the preferred form embodying the invention, and the features forming the invention will be specifically pointed out in the claims.

In the drawings:

Figure 1 is a diagrammatic lay-out of a power plant constructed in accordance with this invention.

Figure 2 is a diagrammatic lay-out of a modified form of power plant embodying the features of the present invention.

Figure 3 is a diagrammatic lay-out of a further modified form, embodying multiple booster and secondary condensers.

In recent years it has become the practice to cool electric generators either by means of air circulation or by means of hydrogen, such systems utilizing circulating water as the medium for cooling the air or hydrogen used to cool the generator. The temperature of the circulating water used for cooling the cooling medium of the generator varies according to the seasons, resulting in diminished cooling of the generator during the summer or hotter months, and consequently resulting in a proportionate decrease in the energy output of the generator.

The present invention comprises, in a power plant, means for refrigerating the circulating water which is employed for cooling the cooling medium of the generator so as to maintain uniform temperature both of the cooling water and of the cooling medium, regardless of the seasons and of outside conditions, and also to provide a definite uniform cooling action on the generator, thereby materially increasing its output at seasons when the energy output would be decreased in proportion to the decrease in cooling thereof.

While the refrigerating structure embodied in the power plant of the present invention is particularly adaptable for refrigerating the cooling water or refrigerating medium which in turn cools the cooling medium of the generator, it is to be understood that the refrigerated water or refrigerant may be used for other purposes in or about the power plant, as for providing the chilled cooling medium for an air conditioning installation, for providing cold drinking water, or for any other uses to which the chilled or refrigerated water or other refrigerating medium may be put.

Referring particularly to the construction shown in Figure 1 of the drawings, a steam turbine of any approved construction is generically indicated at 1, which serves as the prime mover for the electric generator 2. The electric generator 2 may be of any approved construction and it may be of either the air cooled or the hydrogen cooled type, such as are in use at the present time, and the structures of which are well-known to those skilled in the art.

The turbine 1 exhausts its operating steam into the surface condenser 3, which will be called the main condenser in the present application to differentiate it from other condensers employed in the power plant. The main condenser 3 is of any approved type of surface condenser for condensing the exhaust steam, and it has a hot well 4 which receives the condensate, and an air cooler section 5 which acts to cool the non-condensable gases in the condenser, which non-condensable gases and some vapor or steam are evacuated from the condenser 3 by an evacuating means 6, which is shown in Figure 1 of the drawings as a steam jet ejector. The air and vapor evacuated from the condenser 3 by the evacuating means 6, together with the steam employed for operating the evacuating means 6, are discharged into the secondary condenser 7, where the vapor is condensed and the non-condensable gases together with some vapor are withdrawn from the air cooling section 8 of the secondary condenser 7 by an air or non-condensable gas evacuating means 9. In Figure 1 of the drawings the non-condensable gas and vapor evacuating means 9 is shown as comprising an ejector 10 which discharges into a inter-cooler or condenser 11, which condenses part of the vapors or steam delivered thereto by the ejector 10. The non-condensable gases and the vapor not condensed in the condenser 11 are withdrawn therefrom by the ejector 12, which in turn discharges into the after-condenser 14, where the remaining vapor is condensed. The non-condensable gases escape from the after-condenser 14 through the vent 15. If it is so desired a single ejector with an after-cooler may be employed in lieu of the ejectors 10 and 12 and their associated condensers 11 and 14.

The condensate from the main condenser 3 is taken from its hot well 4 by any approved type of condensate pump 16, and is circulated through the tubes of the secondary condenser 7 as the cooling medium of this secondary condenser. The condensate enters the circulating cooling medium inlet of the secondary condenser 7 through a suitable pipe 17, and leaves the condenser 7 through a pipe 18. The pipe 18 delivers the condensate to the cooling medium circulating systems of the inter- and after-condensers 11 and 14, so that the condensate also acts as the cooling medium in these inter- and after-condensers. From the after-condenser 14 the condensate passes to the boiler feed system (not shown) of the power plant through a suitable conduit shown at 19.

The condensate from the secondary condenser 7 passes from the hot well 20 thereof through suitable piping 21 into the main condenser 3, where it mingles with the condensate in the main condenser and passes out through the hot well 4. The piping 21 is arranged to provide a loop seal, and the difference in pressures in the main condenser 3 and the secondary condenser 7 will cause the condensate from the secondary condenser to flow into the main condenser 3.

The condensate from the inter-condenser 11 passes through a suitable piping 22 arranged to form a loop seal into the secondary condenser 7, where it mingles with the condensate therein, and is in turn returned to the main condenser 3. The condensate from the after-condenser 14 passes through a pipe 23 and a trap 24 and part of the length of the pipe 22 into the secondary condenser 7, and thence to the main condenser 3. Thus all of the condensate with its heat is returned to the main condenser 3 and in turn to the boiler feed system through the condensate circulating system heretofore described. If it is so desired traps such as indicated at 24 may be substituted for the loop seals in the condensate pipes.

When the power plant is operating at low loads there may not be sufficient condensate formed in the main condenser 3 to provide the quantity of circulating water necessary for efficient operation of the secondary condenser 7, and to provide for such conditions and insure efficient operation of the secondary condenser 7 at all times, a by-pass 25 is provided which is connected to the pipe 18 between the secondary condenser 7 and the inter-condenser 11. The pipe 25 discharges into the main condenser 3 and it has a valve 26 interposed therein.

The valve 26 is automatically operated by the temperature at the outlet of the circulating cooling condensate of the secondary condenser 7, by means of the gas-filled bulb, which is placed at the outlet of the circulating condensate for the secondary condenser 7. This automatically operated valve structure 26, together with the gas bulb, is of any approved construction which may be purchased upon the open market.

It is necessary to provide a definite flow or outlet temperature of cooling condensate through the secondary condenser at all times so that the secondary condenser 7 will maintain the proper back pressures on the booster ejector 30, which discharges into the secondary condenser 7 and is employed for evacuating the flash tank 31.

The flash tank 31 is of any approved type of flash tank employed in refrigeration operation, in which the water or other refrigerating medium to be cooled is sprayed from the inlet pipe 32, as indicated at 33. The lowering of the pressure in the flash tank 31 by the booster ejector 30 causes the flashing or boiling of the water or refrigerant sprayed into the flash tank, with the resultant cooling thereof. The booster ejector 30 withdraws the air or non-condensable gases and the vapor created in the flash tank 31 therefrom and discharges it, together with the steam required for operating the booster ejector 30, into the secondary condenser, where the vapor is condensed, and consequently the heat extracted from the water or other refrigerating medium in the flash tank 31 is delivered to the feed-water system of the power plant through the secondary condenser 7 and the discharge of its condensate into the main condenser 3.

The steam required for operating the booster ejector 30 may be taken from any suitable source. In the dotted lines indicated at 34, the steam is shown as taken from a bleed from the turbine 1, but it is to be understood that the invention is not to be limited to such source of supply of the operating steam for the ejector 30.

An electrically operated valve 35 is positioned in the steam supply line 36 to the booster ejector 30, and the operating mechanism of this valve is connected in circuit with a temperature controlled mechanism 37, which is operated by the temperature of the water or refrigerating medium in the flash tank 31 through the medium of the usual type of thermal bulb 38 so that when the temperature of the water or cooling medium in the flash tank 31 falls below a predetermined degree the valve 35 will be operated to cut off the flow of steam to the booster ejector 30 and also when the temperature of the cooling medium in the flash tank rises above the predetermined low temperature the valve 35 will be actuated to permit the delivery of operating steam to the booster ejector 30. It is also necessary to control the operation of the booster ejector 30 in accordance with the pressure within the secondary condenser 7, and for this purpose a pressure actuated switch structure 39, of any approved construction, is provided, which is operated by pressure within the secondary condenser 7. The pressure actuated switch 39 is electrically connected in circuit with the temperature actuated switch structure 37 and with the valve 35 so that in case the pressure within the secondary condenser 7 rises above a predetermined point the valve 35 will be actuated to cut off operation of the ejector 30 and will be actuated to permit operation of the booster ejector 30 when the pressure within the secondary condenser falls below the predetermined high for which the pressure actuated switch 39 is set.

The refrigerated cooling medium is withdrawn from the flash tank 31 by a suitable pump 40 of any approved construction by means of which it is delivered to the point of use.

In Figure 1 of the drawings a dotted line circuit is shown by means of which the chilled cooling water or refrigerant is delivered through the delivery line 41 into the cooling system (not shown) of the generator 2, and it is returned from the cooling system of the generator 2 through the return line 42 to the flash tank, where the heat picked up by it in the operation of cooling the cooling medium employed for cooling the generator is extracted therefrom.

While this dotted line system shows the chilled water or refrigerant as being utilized to cool the cooling medium of the generator 2, it is to be understood that the invention does not limit the use of the chilled water or refrigerant to this particular use, but it may be employed for any other uses desired, in or about the power plant, for which it is applicable.

A certain amount of the water is lost in the flash tank 31 by the flashing or boiling operation, and means are provided in the present invention for making up this loss. As shown in Figure 1 of the drawings, the make-up arrangement comprises a connection or pipe 44 which has its inlet connected to the condensate delivering pipe 17 and its outlet opening into the flash tank 31, so that the make-up water supplied to the flash tank will be taken from the condensate from the main condenser 3. Any approved type of float actuated valve 45, which is operated by the liquid level in the flash tank 31, is provided for controlling the delivery of make-up water to the flash tank 31.

The power or electric energy required for operating the electrically operated units 35 and 37 and 39 of the system may be taken from any suitable source, such as a main power line as indicated at 46.

Figure 2 shows a modified arrangement of the power plant embodying the means for refrigeration of a cooling medium in which the turbine 50 operates a generator 51 in the approved manner, which generator may or may not be of the cooled type.

The turbine exhausts into the main condenser 52, which is of the usual surface type employed for condensing steam. The air extraction means indicated at 53 may be of any approved type, for removing the non-condensable gases and some vapor from the main condenser 52. The turbine 50, main condenser 52, air removal means 53, and the condensate circulating system of the modified form shown in Figure 2 may be of any approved construction or arrangement employed in power plants, the present invention being confined, in the form shown in Figure 2, to the combination with the main condenser of means for cooling or refrigerating water or other cooling means.

The water or refrigerant cooling means comprises the flash tank 55 into which the water or other refrigerant is sprayed from the inlet pipe 56 and from which the chilled or refrigerated water or refrigerant is removed through the outlet pipe 57 through the means of a suitable pump 58. The pressure within the flash tank 55 is lowered to provide the desired amount of flashing or boiling for the cooling of the water by means of a booster ejector 59 which receives its operating steam from any suitable source (not shown) through the inlet pipe 60. The inlet pipe 60 has an electrically operated valve 61 mounted therein which is the same as or similar to the valve 35, and is actuated through the energizing of a temperature actuated switch 62. The switch 62 is operated in accordance with the temperature of the water or refrigerant in the flash tank 55 by means of the bulb 63, so that when the temperature of the water in the flash tank falls below a predetermined degree, the operation of the booster ejector 59 will be cut off, and when it rises above the predetermined low degree the operation of the booster ejector 59 will be started.

In this modified construction the booster ejector 59 discharges directly into the main condenser 52, so that the vapor and non-condensable gases withdrawn from the flash tank 55, together with the motive or operating steam of the booster 59 are discharged into the main condenser where the steam or vapor is condensed, the condensation mingling with the condensation of the exhaust steam from the turbine 50.

A make-up water supply connection 64 is provided to make up or compensate for the water lost by flashing in the tank 55. The make-up connection 64 has inlet connection with the condensate discharge line 66 of the main condenser 52, but if it is so desired it may be connected to the condensate outlet 65 of one of the condensers of the evacuating apparatus 53, so that the make-up water supplied to the flash tank is condensate from the power plant system. The delivery of the make-up water to the flash tank 55 is controlled by a make-up valve 67, which is operated by a float 68 positioned within the flash tank 55.

As in the form of the invention shown in Figure 1 of the drawings, the refrigerated water or refrigerant chilled in the flash tank 55 may be used for any desired useful purpose in or about the power plant. It is shown, however, by the dotted line circuits 69 and 70 to be circulated through the cooling structure (not shown) of the generator 51.

While in the foregoing description and in the drawings a single booster or steam jet ejector has been shown and described as used for evacuating the flash tank, it is to be understood of course that any number of such steam jets, necessary to provide the proper tonnage of refrigeration, may be employed without departing from the spirit of the invention, and in fact the various arrangements of ejector or evacuating apparatus may be varied as well as the number, to meet the conditions of each individual power plant, without departing from the spirit of the invention, so long as the arrangement is embraced in the claims.

Figure 3 of the drawings shows a modification of the power plant embodying a plurality of steam jets or booster ejectors for evacuating the flash tank, each of which discharges into its individual condenser, the various condensers being connected in series and evacuated by independent evacuating apparatus. This plant also embodies various automatic controls for the individual control of operation of the booster steam jets and the evacuating apparatus of the individual series condensers.

Referring specifically to the structure shown in Figure 3 of the drawings, the main condenser is shown at 80, and this condenser receives the exhaust steam from a turbine 81 of any approved type, for condensing the exhaust steam and returning the condensate to the boiler feed system, as is usual in power plant operation. The condensate from the condenser 80 passes into its hot well 82 from which it is withdrawn by a suitable condensate pump 83. The condensate pump 83 pumps the condensate through the secondary condensers 84, 85 and 86, where it serves as the cooling water for these condensers. As clearly shown in Figure 3, the circulating cooling water systems of the secondary condensers 84, 85 and 86 are connected in series so that the condensate passes serially through these condensers and out of the discharge 87 of the last of the secondary condensers in the series. From the discharge outlet 87 the condensate is delivered to the inter-cooler or condenser 88 of the final evacuating apparatus 89. From the inter-condenser 88 the condensate passes through the after-condenser 90, and from there to the boiler feed system (not shown) of the power plant.

For the purpose of cooling or refrigerating water for use in or about the power plant, in any of the services above referred to in the description of Figure 1 of the drawings, a flash tank 91 is provided into which the water or refrigerant to be chilled is sprayed from the inlet pipe 92. The chilled water or refrigerant passes from the flash tank 91 through the outlet or discharge system 93, which may have a suitable pump 94 embodied therein.

For the purpose of evacuating the interior of the flash tank 91 to cause flashing or boiling of the water or refrigerant sprayed thereinto to lower its temperature a plurality or battery of booster ejectors or steam jet ejectors 95, 96 and 97 are shown connected to the interior of the flash tank in any approved manner. While three of the evacuating stream jets are shown in Figure 3 of the drawings, it is to be understood that the invention is equally applicable to any number of steam jets, such as may be required to provide the necessary tonnage of refrigeration.

The steam jets 95, 96 and 97 receive their operating steam through the respective steam inlet pipes 98, 99 and 100, and they discharge respectively into the secondary condensers 84, 85 and 86 wherein the operating steam of the respective steam jets together with any condensable vapors withdrawn from the flash tank are condensed.

The condensate from the last secondary condenser 86 flows through the condensate pipe 101, which has a loop seal 102 therein, into the condensate pipe 103 which leads to and discharges into the main condenser 80. The pipe 103 has a loop seal therein of sufficient height to prevent back flow from the main condenser 80. The condensate from the secondary condenser 85 flows through the pipe 104 which has a loop seal therein, into the pipe 103, while the condensate from the secondary condenser 84 flows into the pipe 103 through the pipe 105 and thus all of the condensate from the series of secondary condensers is returned to the main condenser, where it is mixed with the condensate leaving the main condenser and is carried through to the boiler feed system, thus conserving the heat of the condensate.

A make-up supply pipe 106 is connected in the condensate supply line 107 which delivers the condensate from the main condenser 80 to the series of secondary condensers 84, 85 and 86. The pipe 106 has a float controlled valve 108 therein which is controlled by the liquid level in the flash tank 91, so that the flow of make-up condensate to the flash tank is controlled by the liquid level therein.

The non-condensable gases are evacuated from the secondary condensers 84, 85 and 86 by suitable evacuating apparatus 109, 110 and 111, each condenser having its independent evacuating apparatus. The various evacuating devices 109, 110 and 111 discharge into the inter-condenser 88, from which the non-condensable gases and some vapor is drawn by the ejector or evacuating apparatus 112 and discharged into the after-condenser 90. From the after-condenser 90 the air and non-condensable gases escape to atmosphere through the vent 114. The condensate from the inter- and after-condensers 88 and 90 passes therefrom through the condensate pipes 115 and it may be delivered to any one of the secondary condensers 84, 85 or 86, in the manner shown in Figure 1 of the drawings, or to any other desired point in the power plant system.

The operation of the steam jet ejectors 95, 96 and 97 is individually controlled by the temperature of the cooled water in the flash tank 91 through the medium of any approved type of temperature actuated switches, one of which is indicated at 116, and any approved type of motor or solenoid operated valves 117. While only one temperature actuated switch 116 is shown in the drawings, so as to avoid unnecessary confusion, it is to be understood that a temperature actuated switch or control mechanism 116 is to be provided for each of the steam jet ejectors which evacuate the flash tank, and they are to be connected individually to the automatically operated control valves 117 in the steam inlet line to the respective steam jet ejectors, so that the ejectors may be individually controlled. The temperature actuated control mechanisms 116 would be set to operate at different temperatures so that the steam jets would be either cut in or cut out of operation at different times, depending upon the requirement for chilled water or refrigerant.

The automatically operated control valves 117 are also each individually controlled by the pressure within the secondary condenser into which the respective steam jet discharges. Pressure actuated control means for each of the secondary condensers 84, 85 and 86 and its respective ejector 95, 96 or 97 are shown at 118, and these pressure control means are connected in series with the respective temperature actuated control means 116, and they are like-wise connected in series with automatically operated valve structures 119, which may be of any approved type that may be purchased upon the open market. The valve structures 119 are placed in the connections between the evacuating apparatus 109, 110 and 111, and the respective secondary condensers 84, 85 and 86, so that when the various ejectors 95, 96 and 97 are cut off or their operation stopped, due to operation of the pressure control means 118, the evacuating apparatus of the respective secondary condenser will be cut off from the secondary condenser which it evacuates.

The non-condensable gases are withdrawn from the main condenser 80 by any suitable type of evacuating apparatus 120, which is shown in Figure 3 of the drawings as discharging the non-condensable gases and vapor which are withdrawn from the main condenser together with the operating steam of the evacuating apparatus into the secondary condensers, it being shown as discharging into the secondary condenser 86 for purposes of convenient illustration.

The construction and arrangement of the various elements of a power plant as shown in Figure 3 of the drawings, while entailing greater initial or installation costs, provide greater economy and finer regulation in the operation of a plant requiring a relatively large amount of refrigeration.

It will be understood that the invention is not to be limited to the specific construction or arrangement of parts shown, but that they may be widely modified within the invention defined by the claims.

What is claimed is:

1. In a power plant refrigerating system the combination with, a main steam condenser for condensing steam in a power unit including a hot well and means for withdrawing non-condensable gases and vapor from said main condenser, of a secondary surface condenser for condensing vapor withdrawn from said main steam condenser, a flash tank, means for delivering water into said flash tank, a steam jet for evacuating said flash tank to lower the pressure therein for flashing and cooling water delivered thereto, said steam jet discharging into said secondary condenser, and means connecting said hot well and secondary condenser for circulating the condensate from the main condenser as cooling water through said secondary condenser.

2. In a power plant refrigerating system the combination with, a main steam condenser for condensing steam in a power unit including a hot well and means for withdrawing non-condensable gases and vapor from said main condenser, of a secondary surface condenser for condensing vapor withdrawn from said main steam condenser, a flash tank, means for delivering water into said flash tank, a steam jet for evacuating said flash tank to lower the pressure therein for flashing and cooling water delivered thereto, said steam jet discharging into said secondary condenser, means connecting said hot well and secondary condenser for circulating the condensate from the main condenser as cooling water through said secondary condenser, and a connection between the condensate connection to the secondary condenser and said flash tank to deliver a part of the condensate to the flash tank as make-up water therefor.

3. In a power plant refrigerating system the combination with, a main steam condenser for condensing steam in a power unit including a hot well and means for withdrawing non-condensable gases and vapor from said main condenser, of a secondary surface condenser for condensing vapor withdrawn from said main steam condenser, a flash tank, means for delivering water into said flash tank, a steam jet for evacuating said flash tank to lower the pressure therein for flashing and cooling water delivered thereto, said steam jet discharging into said secondary condenser, means connecting said hot well and secondary condenser for circulating the condensate from the main condenser as cooling water through said secondary condenser, a connection between the condensate connection to the secondary condenser and said flash tank to deliver a part of the condensate to the flash tank as make-up water therefor, and means controlled by the water level in the flash tank for controlling the delivery of make-up condensate thereto.

4. In a power plant refrigerating system the combination with, a main steam condenser for condensing steam in a power unit including a hot well and means for withdrawing non-condensable gases and vapor from said main condenser, of a secondary surface condenser for condensing vapor withdrawn from said main steam condenser, a flash tank, means for delivering water into said flash tank, a steam jet for evacuating said flash tank to lower the pressure therein for flashing and cooling water delivered thereto, said steam jet discharging into said secondary condenser, means connecting said hot well and secondary condenser for circulating the condensate from the main condenser as cooling water through said secondary condenser, and a by-pass for returning part of the condensate into the main condenser after it passes through said secondary condenser.

5. A power plant refrigerating system the combination with, a main steam condenser for condensing steam in a power unit including a hot well and, means for withdrawing non-condensable gases and vapor from said main condenser, of a secondary surface condenser for condensing vapor withdrawn from said main steam condenser, a flash tank, means for delivering water into said flash tank, a steam jet for evacuating said flash tank to lower the pressure therein for flashing and cooling water delivered thereto, said steam jet discharging into said secondary condenser, means connecting said hot well and secondary condenser for circulating the condensate from the main condenser as cooling water through said secondary condenser, a by-pass for returning part of the condensate into the main condenser after it passes through said secondary condenser, and means operated by the temperature at the outlet of the circulating condensate of the secondary condenser for controlling the by-passing of condensate to the main condenser.

6. In a power plant refrigerating system the combination with, a main steam condenser for condensing steam in a power unit including a hot well and, means for withdrawing non-condensable gases and vapor from said main condenser, of a secondary surface condenser for condensing vapor withdrawn from said main steam condenser, a flash tank, means for delivering water into said flash tank, a steam jet for evacuating said flash tank to lower the pressure therein for flashing and cooling water delivered thereto, said steam jet discharging into said secondary condenser, means connecting said hot well and secondary condenser for circulating the condensate from the main condenser as cooling water through said secondary condenser, a by-pass for returning part of the condensate into the main condenser after it passes through said secondary condenser, means operated by the temperature at the outlet of the circulating condensate of the secondary condenser for controlling the by-passing of condensate to the main condenser, a connection between the condensate connection to the secondary condenser and said flash tank to deliver a part of the condensate to the flash tank as make-up water, and means controlled by the water level in the flash tank for controlling the delivery of make-up condensate thereto.

7. In a power plant refrigerating system the combination with, a main steam condenser for condensing steam in a power unit including a hot well and, means for withdrawing non-condensable gases and vapor from said main condenser, of a secondary surface condenser for condensing vapor withdrawn from said main steam condenser, a flash tank, means for delivering water into said flash tank, a steam jet for evacuating said flash tank to lower the pressure therein for flashing and cooling water delivered thereto, said steam jet discharging into said secondary condenser, a valve for controlling delivery of operating steam to said steam jet, means actuated by temperature of chilled water in said flash tank for controlling operation of said valve, and pressure actuated means operated by the pressure within said secondary condenser connected to said valve for controlling operation thereof.

8. In a power plant refrigerating system the combination with, a main steam condenser for condensing steam in a power unit including a hot well and, means for withdrawing non-condensable gases and vapor from said main condenser, of a secondary surface condenser for condensing vapor withdrawn from said main steam condenser, a flash tank, means for delivering water into said flash tank, a steam jet for evacuating said flash tank to lower the pressure therein for flashing and cooling water delivered thereto, said steam jet discharging into said secondary condenser, a valve for controlling delivery of operating steam to said steam jet, means actuated by temperature of chilled water in said flash tank for controlling operation of said valve, pressure actuated means operated by the pressure within said secondary condenser connected to said valve for controlling operation thereof, a condensate conduit, a connection between the condensate conduit and the flash tank to deliver a part of the condensate to the flash tank as make-up water therefor, and means controlled by the water lever in the flash tank for controlling the delivery of make-up water thereto.

9. In a power plant refrigerating system the combination with, a main steam condenser for condensing steam in a power unit including a hot well and means for withdrawing non-condensable gases and vapor from said main condenser, of a secondary surface condenser for condensing vapor withdrawn from said main steam condenser, a flash tank, means for delivering water into said flash tank, a steam jet for evacuating said flash tank to lower the pressure therein for flashing and cooling water delivered thereto, said steam jet discharging into said secondary condenser, means connecting said hot well and secondary condenser for circulating the condensate from the main condenser as cooling water through said secondary condenser, a by-pass for returning part of the condensate into the main condenser after it passes through said secondary condenser, evacuating means for withdrawing non-condensable gases and vapor from said secondary condenser, and a condenser for condensing vapor withdrawn from said secondary condenser, the condensate from said main condenser being passed through said last named condenser as cooling water after its passage through said secondary condenser.

10. In a power plant refrigerating system the combination with, a main steam condenser for condensing steam in a power unit including a hot well and means for withdrawing non-condensable gases and vapor from said main condenser, of a secondary surface condenser for condensing vapor withdrawn from said main steam condenser, a flash tank, means for delivering water into said flash tank, a steam jet for evacuating said flash tank to lower the pressure therein for flashing and cooling water delivered thereto, said steam jet discharging into said secondary condenser, means connecting said hot well and secondary condenser for circulating the condensate from the main condenser as cooling water through said secondary condenser, a by-pass for returning part of the condensate into the main condenser after it passes through said secondary condenser, evacuating means for withdrawing non-condensable gases and vapor from said secondary condenser, a condenser for condensing vapor withdrawn from said secondary condenser, the condensate from said main condenser being passed through said last named condenser as cooling water after its passage through said secondary condenser, and means for delivering the condensate from said last named condenser into said secondary condenser.

11. In a power plant refrigerating system the combination with, a main steam condenser for condensing steam in a power unit including a hot well and means for withdrawing non-condensable gases and vapor from said main condenser, of a secondary surface condenser for condensing vapor withdrawn from said main steam condenser, a flash tank, means for delivering water into said flash tank, a steam jet for evacuating said flash tank to lower the pressure therein for flashing and cooling water delivered thereto, said steam jet discharging into said secondary condenser, means connecting said hot well and secondary condenser for circulating the condensate from the main condenser as cooling water through said secondary condenser, a by-pass for returning part of the condensate into the main condenser after it passes through said secondary condenser, evacuating means for withdrawing non-condensable gases and vapor from said secondary condenser, a condenser for condensing vapor withdrawn from said secondary condenser, the condensate from said main condenser being passed through said last named condenser as cooling water after its passage through said secondary condenser, means for delivering the condensate from said last named condenser into said secondary condenser, and means operated by the temperature of the circulating condensate at the outlet of the secondary condenser for controlling the by-passing of condensate to the main condenser.

12. In a power plant refrigerating system the combination with, a main steam condenser for condensing steam in a power unit, of a flash tank, means for delivering liquid to be refrigerated into said flash tank, a plurality of steam jets for evacuating said flash tank to lower the pressure therein to provide cooling of the liquid delivered to the flash tank, a secondary condenser for each of said plurality of steam jets into which the respective steam jets discharge, means for withdrawing non-condensable gases and vapor from said main condenser, said means discharging into one of said secondary condensers, and individual temperature actuated means for each of said steam jets for individually controlling operation of the steam jets.

13. In a power plant refrigerating system the combination with, a main steam condenser for condensing steam in a power unit, of a flash tank, means for delivering liquid to be refrigerated into said flash tank, a plurality of steam jets for evacuating said flash tank to lower the pressure therein to provide cooling of the liquid delivered to the flash tank, a secondary condenser for each of said plurality of steam jets into which the respective steam jets discharge, means for withdrawing non-condensable gases and vapor from said main condenser, said means discharging into one of said secondary condensers, pressure actuated means for each of said secondary condensers and operated by the pressures in the condenser for controlling the operation of the steam jet which discharges into the respective condenser.

14. In a power plant refrigerating system the combination with, a main steam condenser for condensing steam in a power unit, of a flash tank, means for delivering liquid to be refrigerated into said flash tank, a plurality of steam jets for evacuating said flash tank to lower the pressure therein to provide cooling of the liquid delivered to the flash tank, a secondary condenser for each of said plurality of steam jets into which the respective steam jets discharge, means for withdrawing non-condensable gases and vapor from said main condenser, said means discharging into one of said secondary condensers, pressure actuated means for each of said secondary condensers and operated by the pressures in the condenser for controlling the operation of the steam jet which discharges into the respective condenser, means for withdrawing non-condensable gases from said secondary condensers, and means actuated by said pressure operated means for cutting off the connection between the non-condensable gas removing apparatus for the respective secondary condenser the steam jet of which has its operation cut off by the operation of the pressure actuated means.

15. In a power plant refrigerating system the combination with, a main steam condenser for condensing steam in a power unit, of a flash tank, means for delivering liquid to be refrigerated into said flash tank, a plurality of steam jets for evacuating said flash tank to lower the pressure therein to provide cooling of the liquid delivered to the flash tank, a secondary condenser for each of said plurality of steam jets into which the respective steam jets discharge, means connecting said main condenser and said secondary condenser whereby the condensate from the main condenser will be circulated in series through the secondary condensers as a cooling medium for the secondary condensers, and individual temperature actuated means for each of said steam jets for individually controlling operation of the steam jets.

HARRY A. FELDBUSH.
EDWARD E. WAGNER.
CHARLES F. HENDRIE.